(12) United States Patent
Lee et al.

(10) Patent No.: US 8,727,638 B2
(45) Date of Patent: May 20, 2014

(54) FIBER CHANNEL-INTER CHANGEABLE FIBER OPTIC CONNECTOR

(75) Inventors: Jhih-Ping Lee, New Taipei (TW); Kuo-Fu Hsu, Taipei (TW)

(73) Assignee: Alliance Fiber Optic Products Co., Ltd., New Taipei (TW)

( * ) Notice: Subject to any disclaimer, the term of this patent is extended or adjusted under 35 U.S.C. 154(b) by 371 days.

(21) Appl. No.: 13/332,561

(22) Filed: Dec. 21, 2011

(65) Prior Publication Data

US 2013/0163934 A1    Jun. 27, 2013

(51) Int. Cl.
*G02B 6/36*    (2006.01)

(52) U.S. Cl.
USPC ............... 385/78; 385/76; 385/92; 385/139

(58) Field of Classification Search
CPC ............................ G02B 6/3878; G02B 6/3879
USPC ........................................................ 385/139
See application file for complete search history.

(56) References Cited

U.S. PATENT DOCUMENTS

| | | | | |
|---|---|---|---|---|
| 4,687,291 A * | 8/1987 | Stape et al. | ...................... | 385/59 |
| 5,157,749 A * | 10/1992 | Briggs et al. | ...................... | 385/60 |
| 5,315,679 A * | 5/1994 | Baldwin et al. | .................. | 385/76 |
| 6,007,256 A * | 12/1999 | Asada et al. | ...................... | 385/59 |
| 6,435,732 B1 * | 8/2002 | Asao et al. | ........................ | 385/78 |
| 6,511,230 B1 * | 1/2003 | Connelly et al. | ................ | 385/58 |
| 6,517,253 B1 * | 2/2003 | Graesser | .......................... | 385/58 |
| 7,018,108 B2 * | 3/2006 | Makhlin et al. | .................. | 385/78 |
| 7,588,373 B1 * | 9/2009 | Sato et al. | ........................ | 385/53 |
| 7,712,970 B1 * | 5/2010 | Lee | ................................... | 385/58 |
| 8,317,409 B2 * | 11/2012 | Li et al. | ............................ | 385/81 |
| 2003/0059168 A1 * | 3/2003 | Connelly et al. | ................ | 385/58 |
| 2006/0263011 A1 * | 11/2006 | Chen et al. | ...................... | 385/75 |
| 2009/0034911 A1 * | 2/2009 | Murano | .......................... | 385/59 |
| 2010/0080517 A1 * | 4/2010 | Cline et al. | ...................... | 385/92 |
| 2011/0274437 A1 * | 11/2011 | Jones et al. | .................... | 398/141 |
| 2012/0033922 A1 * | 2/2012 | Nakagawa | ...................... | 385/78 |
| 2012/0106897 A1 * | 5/2012 | Cline et al. | ...................... | 385/77 |
| 2012/0155810 A1 * | 6/2012 | Nakagawa | ...................... | 385/78 |
| 2013/0216191 A1 * | 8/2013 | Yamauchi et al. | .............. | 385/84 |
| 2013/0230284 A1 * | 9/2013 | Tamekuni et al. | .............. | 385/78 |

FOREIGN PATENT DOCUMENTS

| WO | WO 2008112986 A1 * | 9/2008 | ............... G02B 6/38 |
|---|---|---|---|
| WO | WO 2010099141 A1 * | 9/2010 | |

* cited by examiner

*Primary Examiner* — Uyen Chau N Le
*Assistant Examiner* — Chad Smith
(74) *Attorney, Agent, or Firm* — Bacon & Thomas, PLLC

(57) ABSTRACT

A fiber channel-interchangeable fiber optic connector includes an adapter, two connectors respectively rotatably mounted in respective axle holes at the front side of the adapter, a sub-assembly detachably attached to the adapter to stop the connectors from rotation and hold down the connectors in position, and a cable inserted through the sub-assembly and mounted in the adapter with two optical-fiber cores therein respectively inserted into ferrules of the connectors. Detaching the sub-assembly from the adapter allows rotation of the connectors and the sub-assembly through 180-degrees angle relative to the adapter to interchange the fiber channels.

10 Claims, 10 Drawing Sheets

FIBER CHANNEL-INTER CHANGEABLE FIBER OPTIC CONNECTOR

BACKGROUND OF THE INVENTION

1. Field of the Invention

The present invention relates to fiber optic connector technology and more particularly, to a fiber channel-interchangeable fiber optic connector that allows quick interchange of fiber channels without dismounting the component parts.

2. Description of the Related Art

With the development and maturity of network technology, network data transmission requirements keep increasing. Under the strong demand for network data transmission, conventional cable transmission techniques cannot satisfy the various needs. Nowadays, fiber optic transmission technology has been intensively used for network data transmission applications for the advantages of high transmission speed, large data transmission capacity and accurate data transmission. In consequence, many different fiber optic connectors have been created for linking of fiber optic cables or fiber optic testing to widen fiber optic application range and to enhance the convenience of fiber optic applications. Because fiber optic cables are prepared by non-metallic materials, they yield excellent EMI shielding performance and confidentiality. For the aforesaid various advantages, optical fiber transmission media have been intensively used in different fields to substitute for conventional metallic cable transmission media.

Regular small package fiber optic connectors include 6 types, i.e., VF-45, MT-RJ, LC, LX.5, Opti-Jack and SCDC-SCQX. Among these specifications, VF-45, MT-RJ and LC are most popularly used.

The LC connector is a small form factor fiber optic connector with fiber spacing of 6.25 mm. It uses a 1.25 mm ferrule, half the dimension of the ST ferrule or a regular ceramic ferrule connector. The LC gives excellent performance and is greatly preferred for single mode transmission.

However, a LC connector is a duplex connector with two fiber channels. During application of a LC connector, it may need to interchange the two fiber channels. FIG. 10 illustrates a duplex connector according to the prior art. According to this design, the duplex connector comprises a housing A having a coupling A1 at the rear side, two mounting holes A2 at the front side and a retaining block A21 in each mounting hole A2, two connectors B respectively mounted in the mounting holes A2, each connector B consisting of a connector housing B1, a boot B2, a spring member B3 and a connection member B4 that has a locating groove B41 forced into engagement with the retaining block A21 in one respective mounting hole A2 of the housing A, and an optical cable C secured to the coupling A1 of the housing A by a constraint relief D and a coupling E with the two optical-fiber cores C1 thereof respectively inserted through the coupling A1 of the housing A into the boots B2 of the connectors B in the mounting holes A2 of the housing A.

The housing A consists of a first shell member A3 and a second shell member A4. The first shell member A3 comprises two hooks A31 respectively located on the front side of the left sidewall and rear side of the right sidewall, and two hook holes A32 respectively located on the rear side of the left sidewall and front side of the right sidewall. The second shell member A4 comprises two hooks A41 respectively located on the rear side of the left sidewall and front side of the right sidewall, and two hook holes A42 respectively located on the front side of the left sidewall and rear side of the right sidewall. By means of forcing the hooks A31 and hook holes A32 of the first shell member A3 into engagement with the hook holes A42 and hooks A41 of the second shell member A4, the first shell member A3 and the second shell member A4 are assembled.

When detaching the first shell member A3 and the second shell member A4 for interchange of the fiber channels, the user cannot detach the respective hooks A31 and A41 from the respective hook holes A42 and A32 by the hands. At this time, a special hand tool must be used so that the first shell member A3 and the second shell member A4 can be detached from each other. After separation of the first shell member A3 and the second shell member A4, the two connectors B in the mounting holes A2 of the housing A must be interchanged. After interchange of the fiber channels, the first shell member A3 and the second shell member A4 must be fastened together again. This fiber channel interchanging operation is complicated and requires a special hand tool. When interchanging the two connectors B, the optical-fiber cores C1 of the optical cable C may be damaged accidentally.

Therefore, there is a strong demand for a fiber optic connector that eliminates the aforesaid problems.

SUMMARY OF THE INVENTION

The present invention has been accomplished under the circumstances in view. It is therefore the object of the present invention to provide a fiber channel-interchangeable fiber optic connector that allows quick interchange of fiber channels without dismounting the component parts. It is another object of the present invention to provide a fiber channel-interchangeable fiber optic connector, which is inexpensive to manufacture, saving much molding and inventory cost.

To achieve these and other objects of the present invention, a fiber channel-interchangeable fiber optic connector comprises an adapter, two connectors, a sub-assembly and a cable. The adapter comprises an inside accommodation chamber, two axle holes located on a front side thereof in a parallel manner and axially disposed in communication with said inside accommodation chamber, two triangle stop blocks respectively located on opposing left and right sidewalls thereof, and two springy hooks respectively and obliquely backwardly extended from opposing top and bottom walls thereof. Each connector comprises a connector housing, a connection member, a ceramic tube, a boot, a ferrule and a dust cap. The connector housing comprises a latch obliquely extended from the top wall thereof. The connection member is mounted in the rear side of the connector housing and comprises a hollow base, a tubular axle perpendicularly extended from the back side of the hollow base and inserted into one axle hole of the adapter, a front tube perpendicularly extended from the front side of the hollow base and kept in axial alignment with said tubular axle. The ceramic tube is mounted in the connector housing and the connection member and partially extending out of the front side of the connector housing. The boot is mounted in the connection member, and attached to the rear end of the ceramic tube. The ferrule is attached to the rear end of the boot and partially extending out of the tubular axle of the connection member. The dust cap is fastened to the front side of the connector housing. The sub-assembly is adapted for housing the adapter, comprising an accommodation chamber extending through opposing front and rear sides thereof for accommodating the adapter, a bottom locating hole located on the rear side of the bottom wall thereof for engagement with the springy hook at the bottom wall of the adapter, a top locating hole located on the rear side of the top wall thereof for engagement with the springy hook at the top wall of the adapter, two side holes respectively located on opposing left and right sidewalls thereof for receiving the triangle stop blocks of the adapter, and a press plate forwardly upwardly extended from the rear side of the top wall thereof and kept in contact with the latches of the two connectors. The cable is inserted through the sub-assembly and mounted in the adapter, comprising two optical-fiber cores extending into the accommodation chamber of the adapter and respectively inserted into the ferrules of the connectors, a strain relief surrounding the optical-fiber cores and inserted into the sub-assembly.

Based on the aforesaid arrangement, fiber channel interchange can be done conveniently by means of inserting a finger into the bottom locating hole and imparting an upward pressure to the springy hook at the bottom wall of the adapter to elastically deform the springy hook and then pulling the sub-assembly backwardly away from the adapter, and then respectively rotating the connectors and the sub-assembly relative to the adapter through 180-degrees angle, and then attaching the sub-assembly to the adapter again to force the springy hooks and the triangle stop blocks into engagement with the bottom locating hole, top locating hole and side holes of the sub-assembly respectively. This fiber channel interchanging operation is quite simple without dismounting the component parts.

The sub-assembly further comprises two guide grooves respectively disposed at opposing top and bottom sides in the accommodation chamber in communication with the bottom locating hole and the top locating hole for guiding the springy hooks of said adapter into engagement with the bottom locating hole and the top locating hole. The guide grooves in the accommodation chamber of the sub-assembly guide insertion of the springy hooks and triangle stop blocks of the adapter into position in the sub-assembly, facilitating quick installation of the sub-assembly with the adapter.

Further, when the sub-assembly is attached to the adapter, the respective end edges of the side holes of the sub-assembly are respectively stopped against respective vertical stop faces of the triangle stop blocks to prohibit forward displacement of the sub-assembly relative to the adapter, and the bottom locating hole of the sub-assembly is engaged with the springy hook at the bottom wall of the adapter to stop the sub-assembly from backward displacement relative to the adapter.

Further, when the sub-assembly is attached to the adapter, two stop strips at the front side of the sub-assembly are respectively stopped at the respective top sides of the hollow bases of the connection members of the two connectors to prohibit the connectors from rotation relative to the adapter and the sub-assembly, allowing the connectors to be positively connected to mating connectors.

Further, the adapter consists of a first adapter shell member and a second adapter shell member. The first adapter shell member and second adapter shell member of the adapter are identical but set in different directions. By means of plugging a locating pin of one of the first adapter shell member and the second adapter shell member into a pinhole of the other of the first adapter shell member and the second adapter shell member, a hook and a hook hole of the first adapter shell member are respectively forced into engagement with a hook hole and a hook of the second adapter shell member, and therefore the first adapter shell member and the second adapter shell member are fastened together. As the first adapter shell member and the second adapter shell member are identical, the invention saves the molding and inventory cost.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
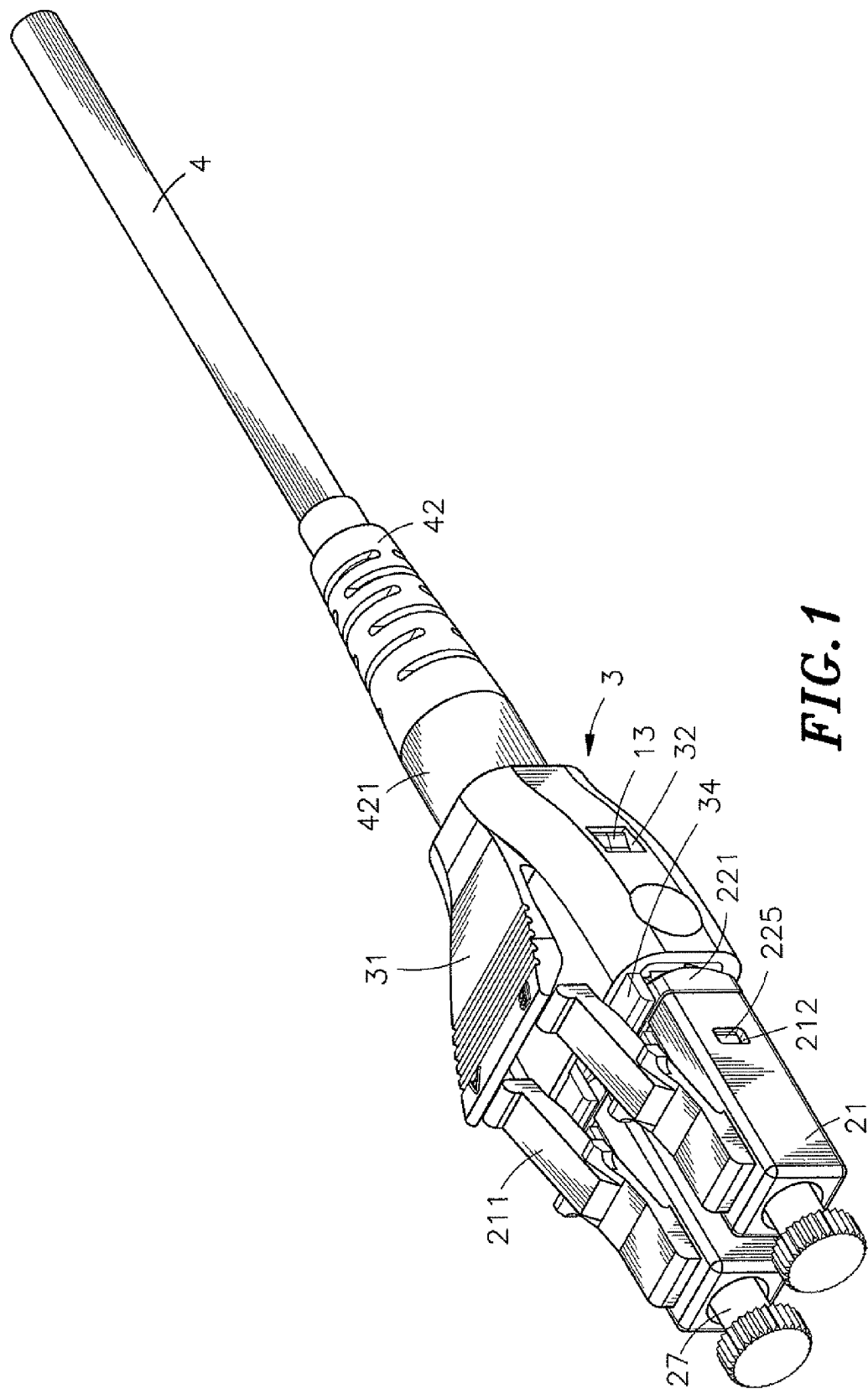
FIG. 1 is an elevational view of a fiber channel-interchangeable fiber optic connector in accordance with the present invention.
Figure 2:
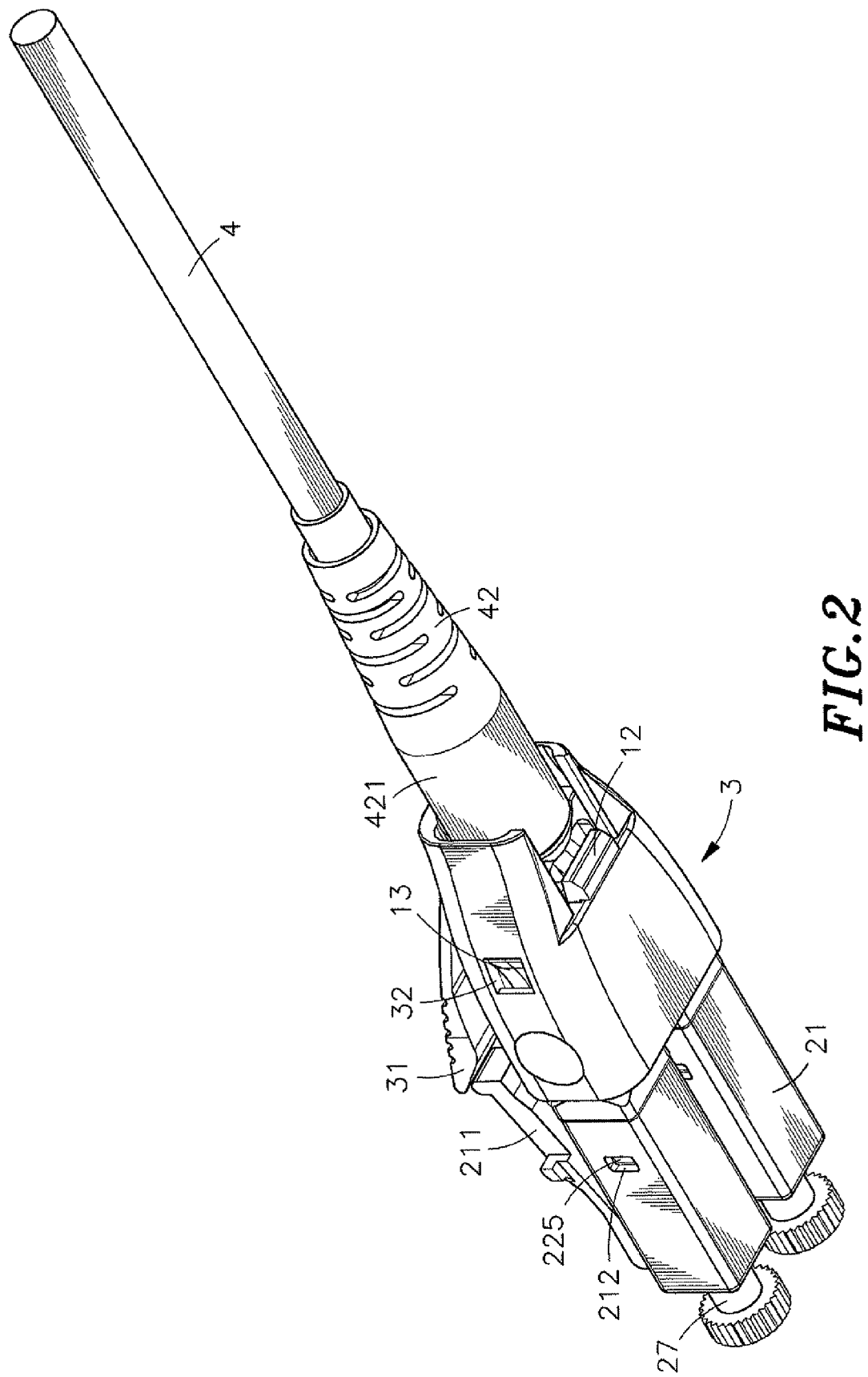
FIG. 2 corresponds to FIG. 1 when viewed from another angle.
Figure 3:
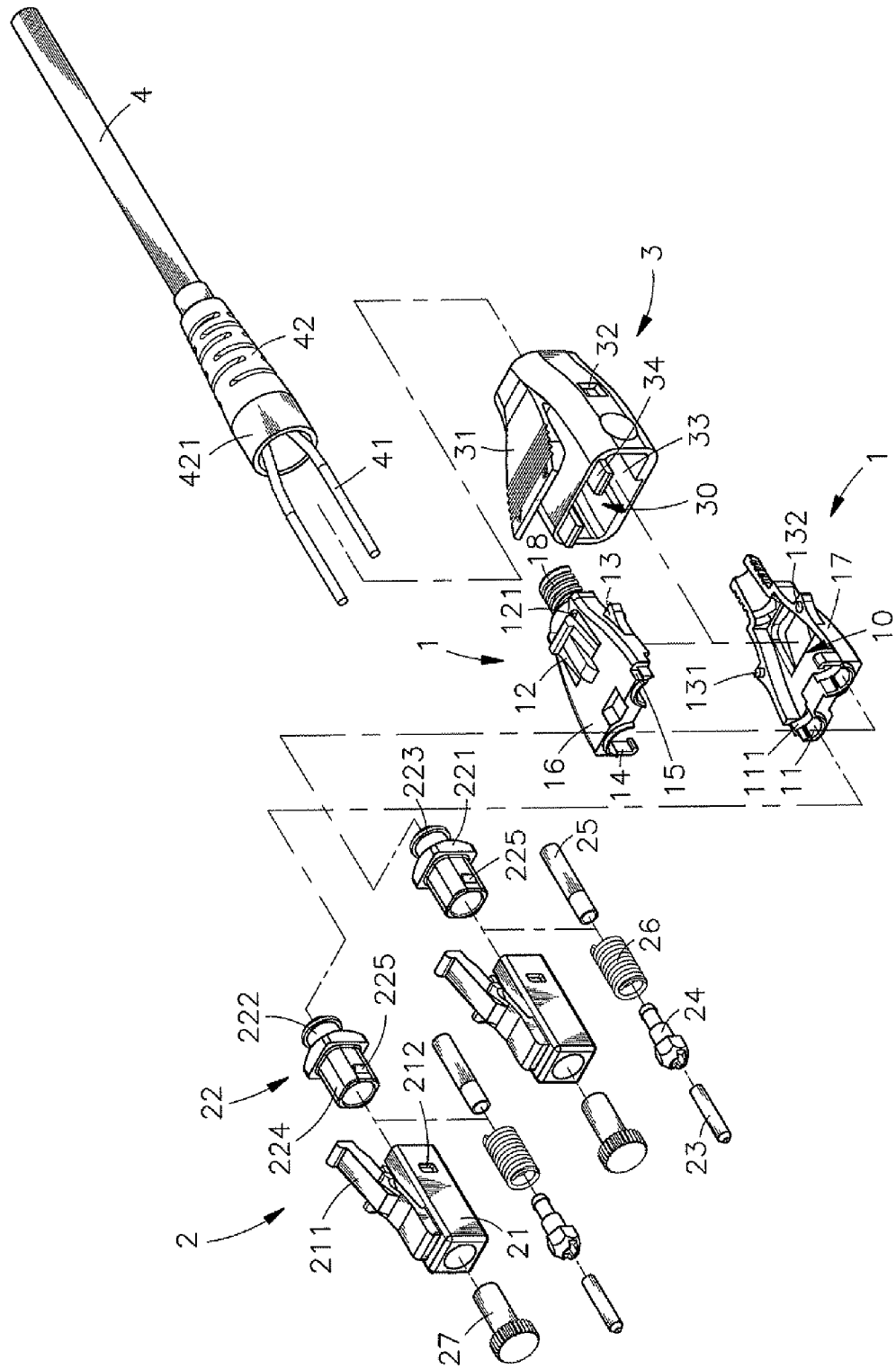
FIG. 3 is an exploded view of the fiber channel-interchangeable fiber optic connector in accordance with the present invention.
Figure 4:
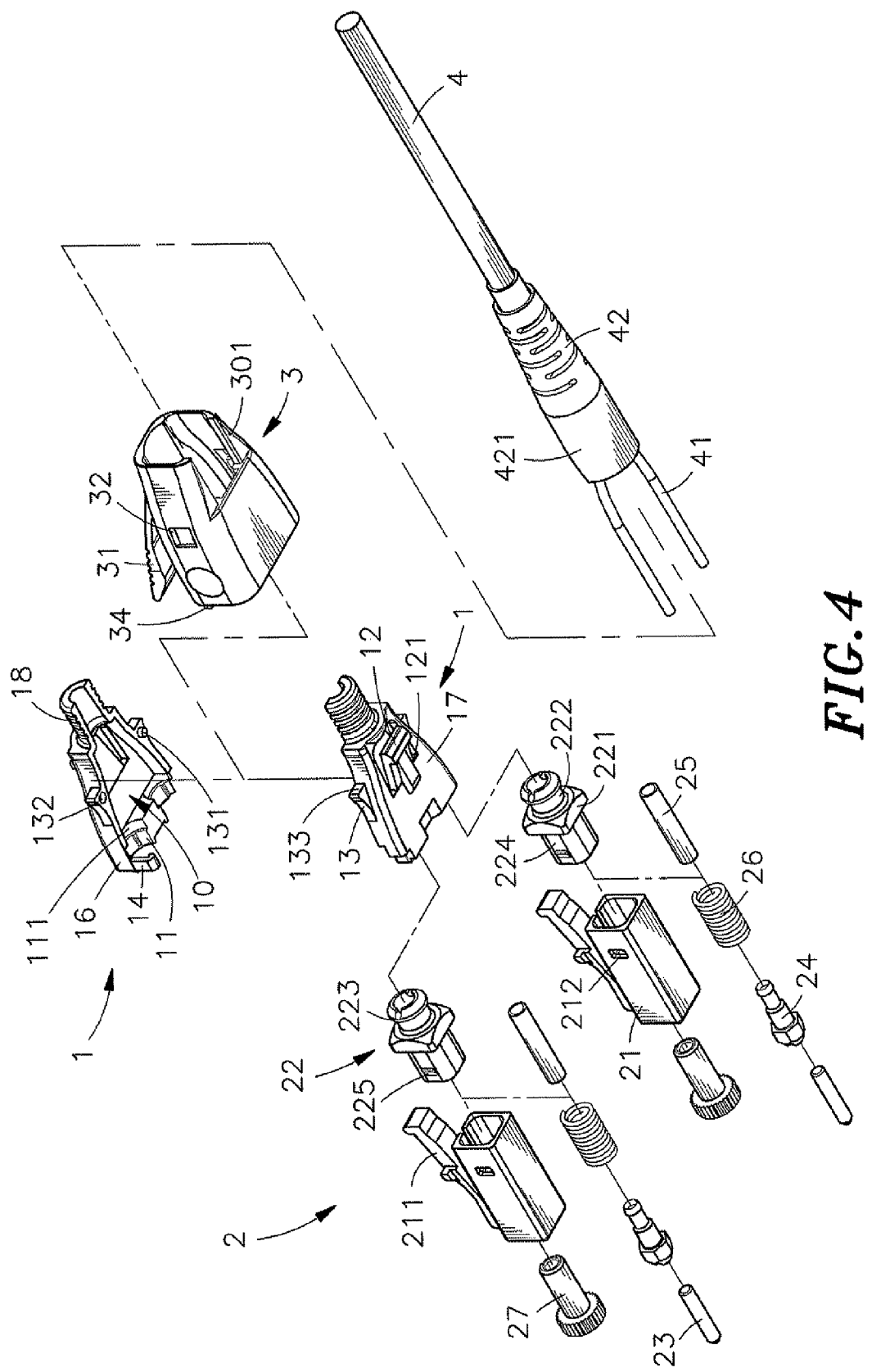
FIG. 4 corresponds to FIG. 3 when viewed from another angle.
Figure 5:
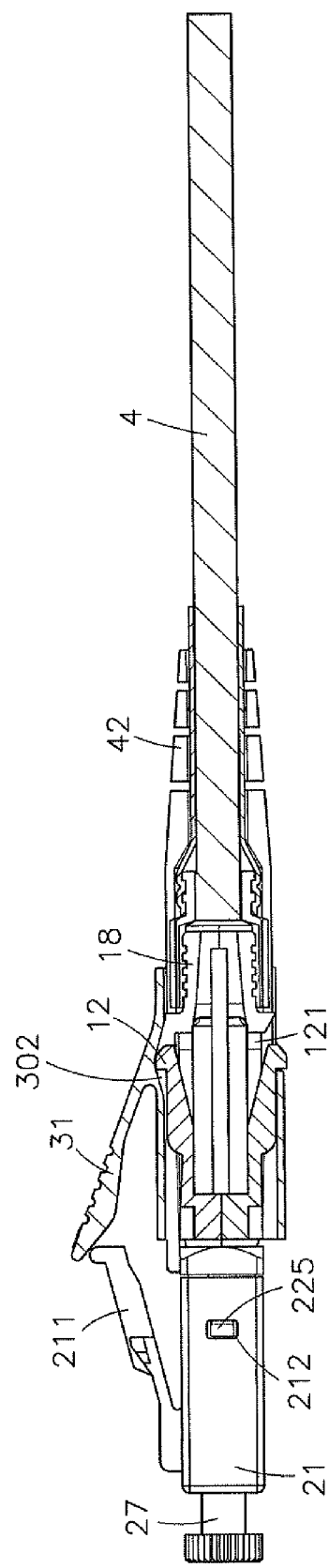
FIG. 5 is a sectional side view of the fiber channel-interchangeable fiber optic connector in accordance with the present invention.

Referring to FIGS. 1-5, a fiber channel-interchangeable fiber optic connector in accordance with the present invention is shown comprising an adapter 1, two connectors 2, a sub-assembly 3 and a cable 4.

The adapter 1 is an electrically insulative hollow shell having a width gradually reduced from the front side toward the rear side. The adapter 1 comprises an inside accommodation chamber 10, two axle holes 11 located on the front side thereof in a parallel manner and axially disposed in communication with the inside accommodation chamber 10, two annular locating grooves 111 respectively extending around the respective inner ends of the axle holes 11 and kept in communication with the inside accommodation chamber 10 and having a diameter greater than the axle holes 11, two springy hooks 12 respectively and obliquely backwardly extended from opposing top and bottom walls thereof, two triangle stop blocks 13 respectively located on opposing left and right sidewalls thereof, and a tubular rear coupling 18 backwardly extended from the rear side thereof in communication with the inside accommodation chamber 10. Each triangle stop block 13 defines a vertical stop face 133 at the rear side thereof.

Each connector 2 comprises a connector housing 21, a connection member 22, a ceramic tube 23, a boot 24, a ferrule 25, a spring member 26 and a dust cap 27. The connector housing 21 is a hollow rectangular member comprising a latch 211 obliquely extended from the top wall thereof, and a retaining hole 212 located on each of the two opposite sidewalls thereof. The connection member 22 is mounted in the rear side of the connector housing 21, comprising a hollow rectangular base 221, a tubular axle 222 perpendicularly extended from the back side of the hollow rectangular base 221 and inserted into one respective axle hole 11 of the adapter 1, a coupling flange 223 extending around the periphery of the tubular axle 222 and coupled to one respective annular locating groove 111 of the adapter 1, a front tube 224 perpendicularly extended from the front side of the hollow rectangular base 221 and kept in axial alignment with the tubular axle 222 and two retaining blocks 225 respectively protruded from the periphery of the front tube 224 at two opposite sides and respectively forced into engagement with the respective retaining holes 212 of the connector housing 21. The ceramic tube 23 is mounted in the connector housing 21 and the connection member 22 and partially extending out of the front side of the connector housing 21. The boot 24 is mounted in the connection member 22 and attached to the rear end of the ceramic tube 23. The ferrule 25 is attached to the rear end of the boot 24 and partially extending out of the rear end of the tubular axle 222 of the connection member 22. The spring member 26 is sleeved onto the ferrule 25 and stopped between the boot 24 and the hollow rectangular base 221 of the connection member 22. The dust cap 27 is fastened to the front side of the connector housing 21.

The sub-assembly 3 is an electrically insulative hollow shell having a width gradually reduced from the front side toward the rear side and adapted for housing the adapter 1. The sub-assembly 3 comprises an accommodation chamber 30 extending through the opposing front and rear sides thereof for accommodating the adapter 1, a bottom locating hole 301 located on the rear side of the bottom wall thereof for engagement with the springy hook 12 at the bottom wall of the adapter 1, a top locating hole 302 located on the rear side of the top wall thereof for engagement with the springy hook 12 at the top wall of the adapter 1, a press plate 31 forwardly upwardly extended from the rear side of the top wall thereof and kept in contact with the latches 211 of the two connectors 2, two side holes 32 respectively located on the opposing left and right sidewalls thereof for receiving the triangle stop blocks 13 of the adapter 1 for enabling the vertical stop faces 133 of the triangle stop blocks 13 to be stopped against respective rear end edges of the side holes 32, two guide grooves 33 respectively disposed at opposing top and bottom sides in the accommodation chamber 30 in communication with the bottom locating hole 301, the top locating hole 302 and the side holes 32, and two stop strips 34 forwardly extended from the front side of the top wall and respectively stopped at the respective top sides of the hollow rectangular bases 221 of the connection members 22 of the two connectors 2.

The cable 4 is inserted through the sub-assembly 3 and mounted in the rear side of the adapter 1, comprising two optical-fiber cores 41 extending into the accommodation chamber 10 of the adapter 1 and respectively inserted into the ferrules 25 of the connectors 2, a strain relief 42 surrounding the optical-fiber cores 41 and inserted into the rear side of the sub-assembly 3, and a coupling 421 extended from the strain relief 42 around the optical-fiber cores 41 and fastened to the tubular rear coupling 18 of the adapter 1.

Figure 6:
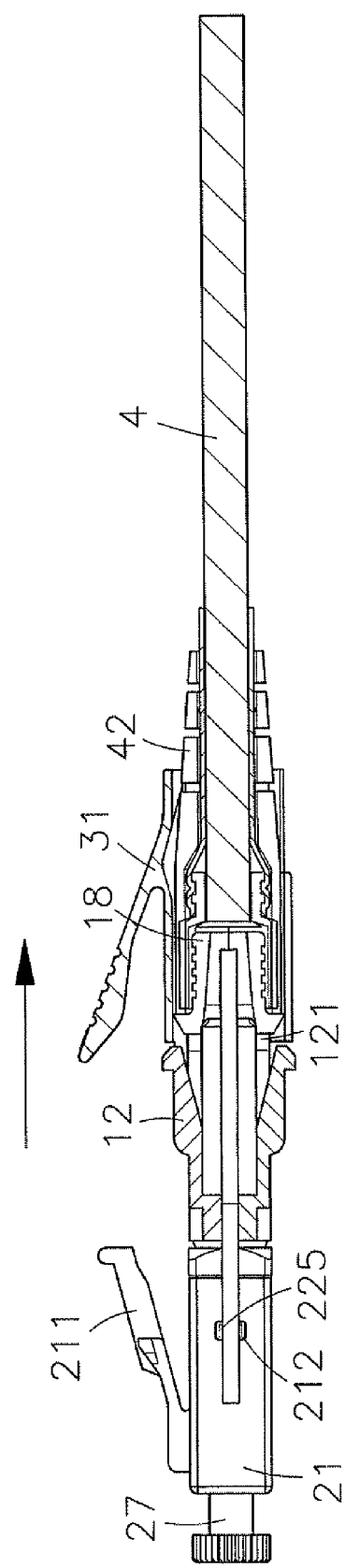
FIG. 6 is a schematic sectional side view of the present invention, illustrating the sub-assembly disconnected from the adapter.
Figure 7:
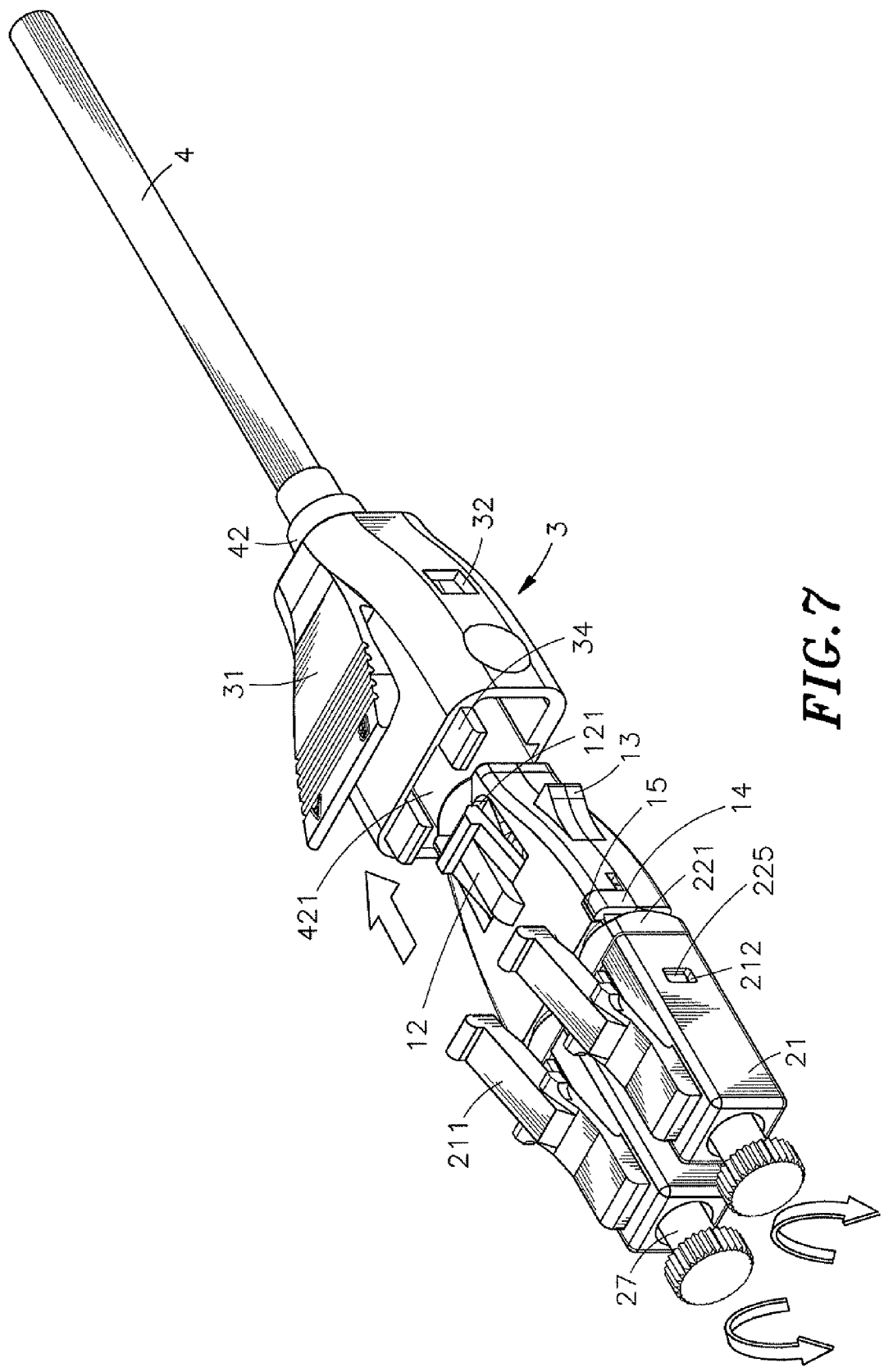
FIG. 7 is a schematic elevational view of the present invention illustrating the sub-assembly disconnected from the adapter before interchange of the fiber channels.
Figure 8:
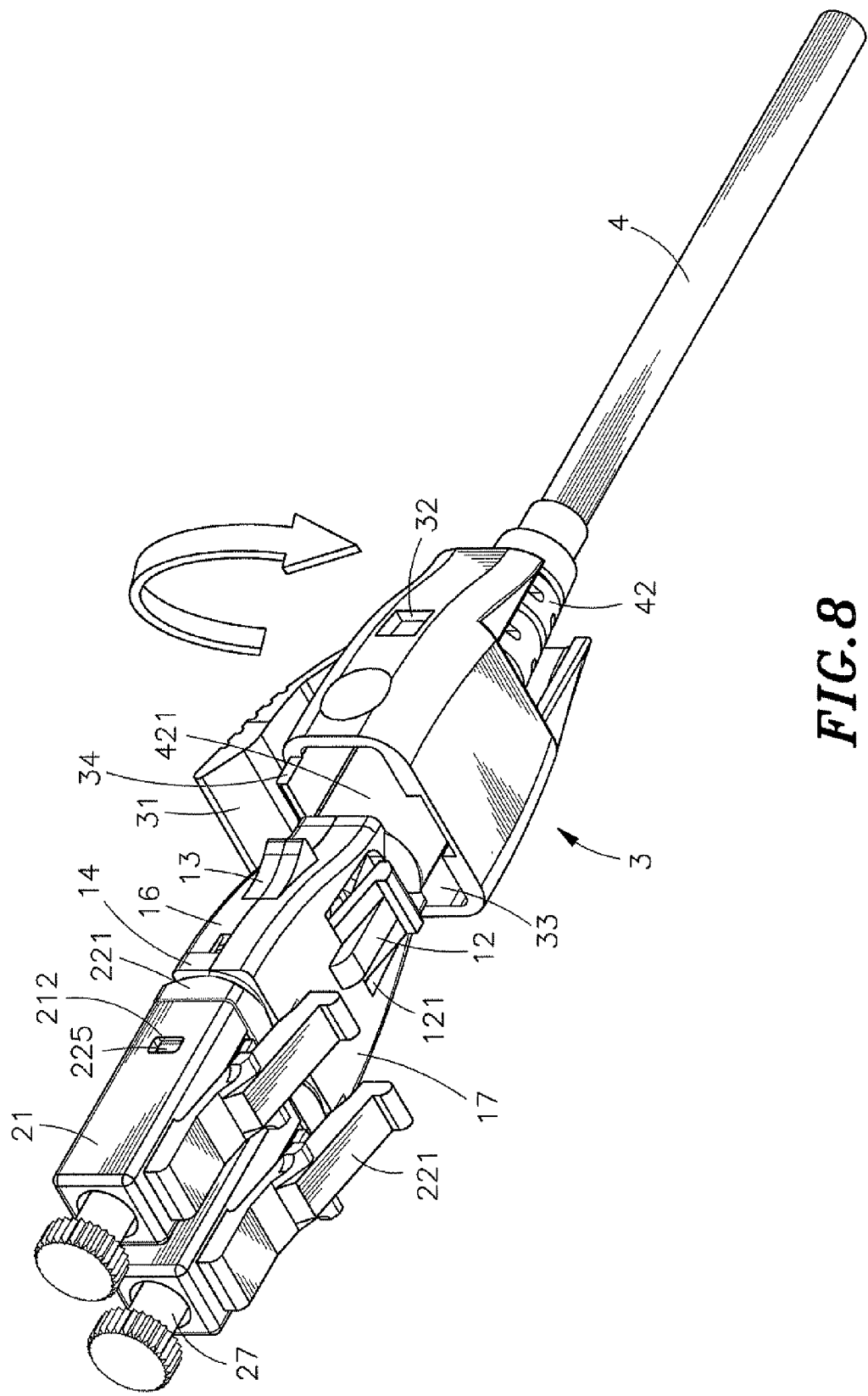
FIG. 8 corresponds to FIG. 7, illustrating the angular direction of the connectors changed.
Figure 9:
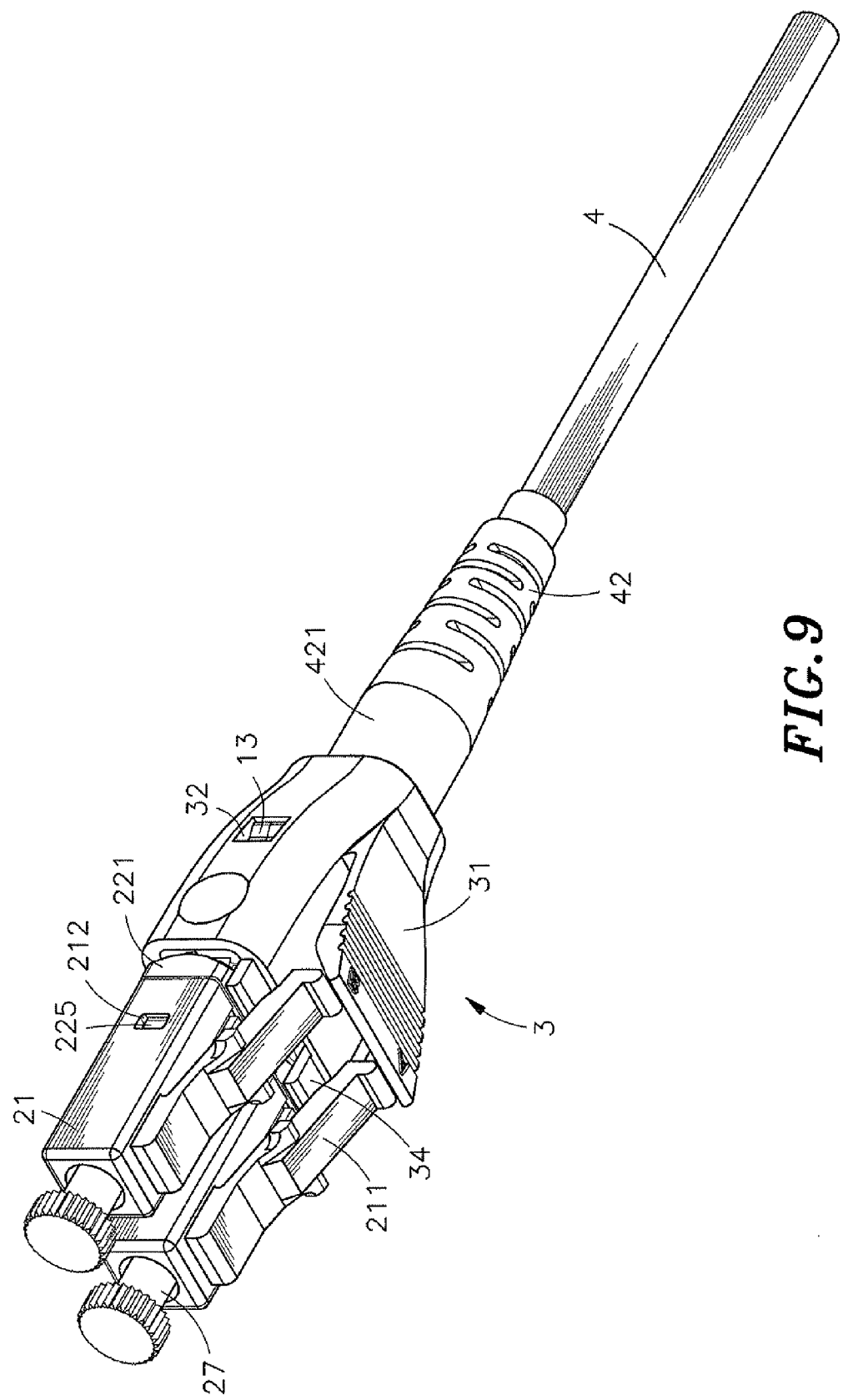
FIG. 9 is an elevational view of the present invention after interchange of the fiber channels.
Figure 10:
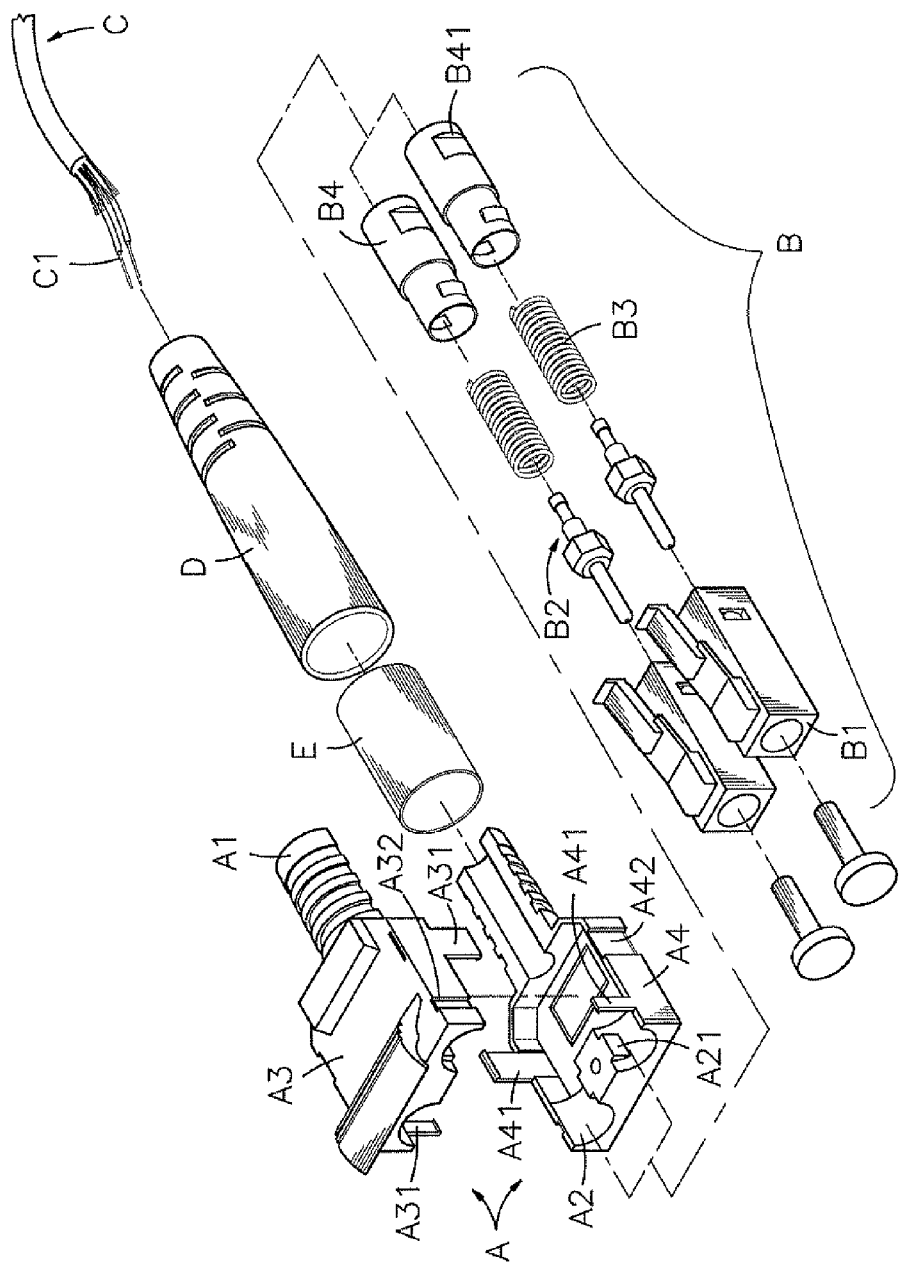
FIG. 10 is an exploded view of a fiber optic connector according to the prior art.

Referring to FIGS. 6~9 and FIGS. 1~5 again, when going to interchange the fiber channels of the two optical-fiber cores 41, insert a finger into the bottom locating hole 301 and impart an upward pressure to the springy hook 12 at the bottom wall of the adapter 1 to elastically deform the springy hook 12, and then pull the sub-assembly 3 backwardly away from the adapter 1 to disengage the springy hooks 12 of the adapter 1 from the bottom locating hole 301 and top locating hole 302 of the sub-assembly 3 and the triangle stop blocks 13 of the adapter 1 from the respective side holes 32 of the sub-assembly 3, and then keep pulling the sub-assembly 3 backwardly away from the adapter 1 to the extent where the springy hooks 12 and the triangle stop blocks 13 are moved out of the sub-assembly 3 subject to the guidance of the guide grooves 33, and then rotate the connectors 2 relative to the adapter 1 through 180-degrees angle to change the latches 211 from the top side position to the bottom side position, and then rotate the sub-assembly 3 through 180-degrees angle relative to the adapter 1 to change the press plate 31 from the top side position to the bottom side position.

Thereafter, move the sub-assembly 3 forwardly toward the adapter 1 to force the springy hooks 12 and the triangle stop blocks 13, subject to the guidance of the guide grooves 33, into engagement with the bottom locating hole 301, top locating hole 302 and side holes 32 of the sub-assembly 3 respectively. At this time, the vertical stop faces 133 of the triangle stop blocks 13 are respectively stopped against the respective rear end edges of the side holes 32, and the press plate 31 of the sub-assembly 3 is kept in contact with the latches 211 of the connectors 2. Thus, the fiber channels of the two optical-fiber cores 41 of the cable 4 are interchanged. By means of rotating the connectors 2 through 180-degrees angle, the fiber channels of the two optical-fiber cores 41 of the cable 4 are interchanged for data transmission to fit different application requirements. This fiber channel interchanging operation is simple without dismounting the component parts, facilitating application.

Further, when performing the fiber channel interchanging operation, the user can rotate the two connectors 2 relative to the adapter 1 at first and then rotate the sub-assembly 3 relative to the adapter 1; alternatively, the user can rotate the sub-assembly 3 relative to the adapter 1 at first and then rotate the two connectors 2 relative to the adapter 1. The change of the sequence in rotating the two connectors 2 and the sub-assembly 3 does not affect the assembly or transmission effects. By means of changing the angular position of the connectors 2 and the sub-assembly 3 relative to the adapter 1, the fiber channels of the optical-fiber cores 41 of the cable 4 are interchanged to fit different application requirements.

Referring to FIGS. 3, 4, 5, 7 and 8 again, the adapter 1 consists of a first adapter shell member 16 and a second adapter shell member 17. The first adapter shell member 16 and the second adapter shell member 17 are identical but set in different directions, each having a locating pin 131 and a pinhole 132 respectively located on the triangle stop blocks 13 and a hook 14 and a hook hole 15 respectively disposed adjacent to the axle holes 11. By means of plugging the locating pin 131 of one of the first adapter shell member 16 and the second adapter shell member 17 into the pinhole 132 of the other of the first adapter shell member 16 and the second adapter shell member 17, the hook 14 and hook hole 15 of the first adapter shell member 16 are respectively forced into engagement with the hook hole 15 and hook 14 of the second adapter shell member 17, and therefore the first adapter shell member 16 and the second adapter shell member 17 are fastened together. As the first adapter shell member 16 and the second adapter shell member 17 are identical, the invention saves the molding and inventory cost. However, the aforesaid two-piece adapter design is not a limitation. Alternatively, the adapter 1 can be a one-piece design.

Referring to FIGS. 1~8 again, the guide grooves 33 in the accommodation chamber 30 of the sub-assembly 3 are adapted for guiding the springy hooks 12 and triangle stop blocks 13 of the adapter 1, facilitating quick installation of the sub-assembly 3 with the adapter 1. When the sub-assembly 3 is attached to the adapter 1, the respective end edges of the side holes 32 of the sub-assembly 3 are respectively stopped against the vertical stop face 133 of the triangle stop block 13 to prohibit forward displacement of the sub-assembly 3 relative to the adapter 1. At this time, the bottom locating hole 301 of the sub-assembly 3 is engaged with the springy hook 12 at the bottom wall of the adapter 1 to stop the sub-assembly 3 from backward displacement relative to the adapter 1. Thus, the sub-assembly 3 and the adapter 1 are firmly secured together. Further, when the sub-assembly 3 is attached to the adapter 1, the two stop strips 34 of the sub-assembly 3 are respectively stopped at the respective top sides of the hollow rectangular bases 221 of the connection members 22 of the two connectors 2 to prohibit the connectors 2 from rotation relative to the adapter 2 and the sub-assembly 3, allowing the connectors 2 to be positively connected to mating connectors.

Further, the guide grooves 33 reduces gradually from the front side of the sub-assembly 3 toward the rear side thereof, facilitating insertion of the springy hooks 12 of the adapter 1 into the sub-assembly 3 without special alignment and effectively and accurately guiding the springy hooks 12 into position. Thus, the design of the guide grooves 33 facilitates quick and accurate installation.

In actual application, the fiber channel-interchangeable fiber optic connector has the advantages and features as follows:

1. Fiber channel interchange can be done conveniently by means of inserting a finger into the bottom locating hole 301 and imparting an upward pressure to the springy hook 12 at the bottom wall of the adapter 1 to elastically deform the springy hook 12 and then pulling the sub-assembly 3 backwardly away from the adapter 1, and then respectively rotating the connectors 2 and the sub-assembly 3 relative to the adapter 1 through 180-degrees angle, and then attaching the sub-assembly 3 to the adapter 1 again to force the springy hooks 12 and the triangle stop blocks 13 into engagement with the bottom locating hole 301, top locating hole 302 and side holes 32 of the sub-assembly 3 respectively. This fiber channel interchanging operation is quite simple without dismounting the component parts.
2. The guide grooves 33 in the accommodation chamber 30 of the sub-assembly 3 guide insertion of the springy hooks 12 and triangle stop blocks 13 of the adapter 1 into position in the sub-assembly 3, facilitating quick installation of the sub-assembly 3 with the adapter 1.
3. When the sub-assembly 3 is attached to the adapter 1, the respective end edges of the side holes 32 of the sub-assembly 3 are respectively stopped against the vertical stop faces 133 of the triangle stop blocks 13 to prohibit forward displacement of the sub-assembly 3 relative to the adapter 1, and the bottom locating hole 301 of the sub-assembly 3 is engaged with the springy hook 12 at the bottom wall of the adapter 1 to stop the sub-assembly 3 from backward displacement relative to the adapter 1.
4. When the sub-assembly 3 is attached to the adapter 1, the two stop strips 34 of the sub-assembly 3 are respectively stopped at the respective top sides of the hollow rectangular bases 221 of the connection members 22 of the two connectors 2 to prohibit the connectors 2 from rotation relative to the adapter 2 and the sub-assembly 3, allowing the connectors 2 to be positively connected to mating connectors.
5. The first adapter shell member 16 and second adapter shell member 17 of the adapter 1 are identical but set in different directions. By means of plugging the locating pin 131 of one of the first adapter shell member 16 and the second adapter shell member 17 into the pinhole 132 of the other of the first adapter shell member 16 and the second adapter shell member 17, the hook 14 and hook hole 15 of the first adapter shell member 16 are respectively forced into engagement with the hook hole 15 and hook 14 of the second adapter shell member 17, and therefore the first adapter shell member 16 and the second adapter shell member 17 are fastened together. As the first adapter shell member 16 and the second adapter shell member 17 are identical, the invention saves the molding and inventory cost.

In conclusion, the invention provides a fiber channel-interchangeable fiber optic connector, which enables fiber channel interchange to be done conveniently by means of inserting a finger into the bottom locating hole 301 of the sub-assembly 3 and imparting an upward pressure to the springy hook 12 at the bottom wall of the adapter 1 to elastically deform the springy hook 12 and then pulling the sub-assembly 3 backwardly away from the adapter 1, and then respectively rotating the connectors 2 and the sub-assembly 3 relative to the adapter 1 through 180-degrees angle, and then attaching the sub-assembly 3 to the adapter 1 again to force the springy hooks 12 and the triangle stop blocks 13 into engagement with the bottom locating hole 301, top locating hole 302 and side holes 32 of the sub-assembly 3 respectively. This fiber channel interchanging operation is quite simple without dismounting the component parts.

Although a particular embodiment of the invention has been described in detail for purposes of illustration, various modifications and enhancements may be made without departing from the spirit and scope of the invention.

What the invention claimed is:

1. A fiber channel-interchangeable fiber optic connector, comprising:

an adapter comprising an inside accommodation chamber, two axle holes located on a front side thereof in a parallel manner and axially disposed in communication with said inside accommodation chamber, and two springy hooks respectively and obliquely backwardly extended from opposing top and bottom walls thereof;

two connectors, each said connector comprising a connector housing, a connection member, a ceramic tube, a boot, a ferrule and a dust cap, said connector housing comprising a latch obliquely extended from a top wall thereof, said connection member being mounted in a rear side of said connector housing and comprising a hollow base, a tubular axle perpendicularly extended from a back side of said hollow base and inserted into one said axle hole of said adapter, a front tube perpendicularly extended from a front side of said hollow base and kept in axial alignment with said tubular axle, said ceramic tube being mounted in said connector housing and said connection member and partially extending out of a front side of said connector housing, said boot being mounted in said connection member and attached to a rear end of said ceramic tube, said ferrule being attached to a rear end of said boot and partially extending out of said tubular axle of said connection member, said dust cap being fastened to a front side of said connector housing;

a sub-assembly adapted for housing said adapter, said sub-assembly comprising an accommodation chamber extending through opposing front and rear sides thereof for accommodating said adapter, a bottom locating hole located on a rear side of a bottom wall thereof for engagement with the springy hook at the bottom wall of said adapter, a top locating hole located on a rear side of a top wall thereof for engagement with the springy hook at the top wall of said adapter, and a press plate forwardly upwardly extended from the rear side of the top wall thereof and kept in contact with the latches of said two connectors; and a cable inserted through said sub-assembly and mounted in said adapter, said cable comprising two optical-fiber cores extending into said accommodation chamber of said adapter and respectively inserted into the ferrules of said connectors, a strain relief surrounding said optical-fiber cores and inserted into said sub-assembly.

2. The fiber channel-interchangeable fiber optic connector as claimed in claim 1, wherein said adapter further comprises two annular locating grooves respectively extending around respective inner ends of said axle holes and kept in communication with said inside accommodation chamber, said annular locating grooves having a diameter greater than said axle holes; each said connector further comprises a coupling flange extending around the periphery of the tubular axle thereof and coupled to one said annular locating groove of said adapter.

3. The fiber channel-interchangeable fiber optic connector as claimed in claim 1, wherein said sub-assembly and said adapter respectively gradually reduce in width from the front side toward the rear side thereof; said adapter further comprises two triangle stop blocks respectively located on opposing left and right sidewalls thereof, each said triangle stop block defining a vertical stop face at a rear side thereof; said sub-assembly further comprises two side holes respectively located on opposing left and right sidewalls thereof for receiving said triangle stop blocks of said adapter for enabling the vertical stop faces of said triangle stop blocks to be stopped against respective rear end edges of said side holes.

4. The fiber channel-interchangeable fiber optic connector as claimed in claim 1, wherein said adapter further comprises a tubular rear coupling backwardly extended from a rear side thereof in communication with said inside accommodation chamber; said cable further comprises a coupling extended from said strain relief around said optical-fiber cores and fastened to the tubular rear coupling of said adapter.

5. The fiber channel-interchangeable fiber optic connector as claimed in claim 1, wherein said connector housing of each said connector further comprises a retaining hole located on each of two opposite sidewalls thereof; said connection member of each said connector further comprises two retaining blocks respectively protruded from the periphery of the front tube thereof at two opposite sides and respectively forced into engagement with the respective retaining holes of the associating connector housing.

6. The fiber channel-interchangeable fiber optic connector as claimed in claim 1, wherein each said connector further comprises a spring member sleeved onto said ferrule and stopped between said boot and said hollow base of said connection member.

7. The fiber channel-interchangeable fiber optic connector as claimed in claim 1, wherein said sub-assembly further comprises two guide grooves respectively disposed at opposing top and bottom sides in said accommodation chamber in communication with said bottom locating hole and said top locating hole for guiding said springy hooks of said adapter into engagement with said bottom locating hole and said top locating hole.

8. The fiber channel-interchangeable fiber optic connector as claimed in claim 1, wherein said connector housing of each said connector has a rectangular configuration; said hollow base of said connection member of each said connector has a rectangular configuration; said sub-assembly further comprises two stop strips forwardly extended from the top wall thereof and respectively stopped at respective top sides of the hollow bases of the connection members of said two connectors.

9. The fiber channel-interchangeable fiber optic connector as claimed in claim 1, wherein said adapter is a one-piece member.

10. The fiber channel-interchangeable fiber optic connector as claimed in claim 1, wherein said adapter consists of a first adapter shell member and a second adapter shell member, said first adapter shell member and said second adapter shell member each comprising a locating pin and a pinhole respectively disposed at two opposite lateral sides and a hook and a hook hole respectively disposed adjacent to said axle holes, the locating pin of one of said first adapter shell member and said second adapter shell member being plugged into the pinhole of the other of said first adapter shell member and said second adapter shell member, the hook and hook hole of said first adapter shell member being respectively forced into engagement with the hook hole and hook of said second adapter shell member.

* * * * *